(12) United States Patent
Zhang et al.

(10) Patent No.: US 11,148,233 B2
(45) Date of Patent: Oct. 19, 2021

(54) LEAK-TIGHT HEAT EXCHANGER INTEGRITY INSPECTION USING TRACER MATERIAL

(71) Applicant: Hanon Systems, Daejeon (KR)

(72) Inventors: Qiong Zhang, Royal Oak, MI (US); Luan Gara, Northville, MI (US); Guglielmo Abate, Canton, MI (US); Craig Shaner, Ann Arbor, MI (US)

(73) Assignee: HANON SYSTEMS, Daejeon (KR)

( * ) Notice: Subject to any disclaimer, the term of this patent is extended or adjusted under 35 U.S.C. 154(b) by 251 days.

(21) Appl. No.: 16/515,214

(22) Filed: Jul. 18, 2019

(65) Prior Publication Data

US 2021/0016396 A1   Jan. 21, 2021

(51) Int. Cl.
| | |
|---|---|
| *B23K 31/12* | (2006.01) |
| *B23K 1/00* | (2006.01) |
| *G01M 3/20* | (2006.01) |
| *B23K 11/25* | (2006.01) |
| *B23K 31/00* | (2006.01) |
| *B23K 20/12* | (2006.01) |
| *B23K 35/02* | (2006.01) |
| *B23K 103/10* | (2006.01) |
| *B23K 101/14* | (2006.01) |

(52) U.S. Cl.
CPC .......... *B23K 31/125* (2013.01); *B23K 1/0012* (2013.01); *B23K 11/253* (2013.01); *B23K 20/123* (2013.01); *B23K 31/003* (2013.01); *B23K 31/12* (2013.01); *B23K 35/0222* (2013.01); *G01M 3/20* (2013.01); *B23K 2101/14* (2018.08); *B23K 2103/10* (2018.08)

(58) Field of Classification Search
CPC .... B23K 31/125; B23K 31/003; B23K 31/12; B23K 1/0012; B23K 11/253; B23K 20/123; B23K 35/0222; B23K 2103/10; B23K 2101/14; G01M 3/20; G01M 3/225; G01M 3/228
USPC ........ 156/64, 272.4, 275.5; 73/150 A, 150 R
See application file for complete search history.

(56) References Cited

U.S. PATENT DOCUMENTS

| | | | | |
|---|---|---|---|---|
| 3,351,760 | A | * | 11/1967 | Brown ................ B29C 66/7254 250/303 |
| 6,328,700 | B1 | * | 12/2001 | Rheinhardt ........ A61K 51/1255 600/3 |
| 9,671,222 | B2 | | 6/2017 | Maierhofer |
| 2007/0145259 | A1 | * | 6/2007 | Gilchrist ................ G01V 5/101 250/269.1 |
| 2012/0180928 | A1 | * | 7/2012 | Bruck .................. B23K 35/304 156/64 |

(Continued)

*Primary Examiner* — Kiet T Nguyen
(74) *Attorney, Agent, or Firm* — Shumaker, Loop & Kendrick, LLP; James D. Miller (57) ABSTRACT

An inspection system is configured to inspect the condition of a braze joint formed within a structure, wherein the braze joint is formed from a braze filler material having a tracer material disposed therein. The inspection system includes an energy source for directing energy towards the structure, an energy detector for detecting information regarding the structure following interaction with the energy directed from the energy source, and a data analysis system for analyzing the information detected by the energy detector. The data analysis system is configured to distinguish the tracer material from the remaining materials forming the structure in order to determine a suitability of the braze joint.

9 Claims, 3 Drawing Sheets

(56) References Cited

U.S. PATENT DOCUMENTS

2017/0285219 A1\* 10/2017 Brady .................... G01V 5/101

\* cited by examiner

LEAK-TIGHT HEAT EXCHANGER INTEGRITY INSPECTION USING TRACER MATERIAL

FIELD OF THE INVENTION

The invention relates generally to a system and method for inspecting the integrity of a joint formed between two components, and particularly to a method and apparatus for detecting the energy signature of a tracer material associated with the formation of the joint.

BACKGROUND

Many components used in automotive applications require the coupling of a large quantity of separate components and related surfaces for forming a larger structure. For example, the heat exchangers used in climate control systems and component cooling systems may include a plurality of metallic components that are coupled to each other in order to form suitable manifolds and flow channels for distributing one or more heat exchanging fluids through the corresponding heat exchanger.

Such heat exchangers or similar structures may preferably be formed via a brazing process. The brazing process may include the formation of a plurality of core elements formed from a first material that are coated or clad on one or more surfaces with a second material acting as a braze filler material. The second material is provided to include a lower melting temperature than the first material used to form the core elements. The second material accordingly melts prior to the first material upon a heating of the core elements, which in turn allows for the second material to flow in a manner suitable for mechanically joining the core elements formed from the first material.

The brazing process is particularly suited for forming internal joints within a heat exchanger that are otherwise unable to be accessed when the core components of the heat exchanger structure are placed in a coupling position. As one example, plate-type heat exchangers often include a plurality of plates with each of the plates having openings, dimples, projections, or other flow dividing features formed therein. The plates may be coupled to each other via a brazing process in a manner wherein the aforementioned features of adjacent plates cooperate to form the internal flow paths extending through the plate-type heat exchanger. As another example, many air passed heat exchangers utilize spaced apart heat exchanger tubes that include internal flow features for imparting desired flow characteristics on the heat exchanging fluid passing therethrough. Such internal features may include fins or flow dividers for mixing and directing the heat exchanging fluid in a desired manner.

The failure to properly form the internal joints present within either of the heat exchanger types disclosed above may lead to the formation of undesired flow patterns or even leaking between adjacent compartments or flow paths formed in the heat exchanger. Such undesired flow may lead to a reduction in the efficiency of the heat exchanger or an eventual failure thereof. For example, thermal gradients may form within the corresponding heat exchanger as a result of the undesired flow of the heat exchanging fluid, wherein such temperature differences can lead to undesired relative thermal expansion between adjacent elements of the heat exchanger that can promote leaking or the formation of undesired flow paths through the internal structure of the heat exchanger.

The integrity of the joints formed in such a heat exchanging structure may be inspected by subjecting the heat exchanging structure to one or more leakage tests following production thereof, such as bubble testing or burst pressure testing the resultant structure. However, such leakage tests are often performed on the entirety of the heat exchanger or even an associated system having the heat exchanger, which may render it especially difficult to detect localized leaks, and especially localized internal leaks formed by the failure to form one or more internal joints disposed within the heat exchanger.

Accordingly, there exists a need in the art for an improved and cost effective method of inspecting the joints formed in a resultant structure, and especially an automated inspection method capable of determining the integrity of joints forming interior surfaces of the resultant structure.

SUMMARY

In concordance with the instant disclosure, an improved system and method for inspecting the integrity of brazed joints formed between coupled elements of a structure has surprisingly been discovered.

According to an embodiment of the instant disclosure, an inspection system comprises an energy detector configured to detect a presence of a tracer material in a structure, a data analysis system in signal communication with the energy detector and configured to receive data regarding the detection of the presence of the tracer material in the structure, and an energy source configured to direct energy towards the structure being tested.

According another embodiment of the instant disclosure, a method of inspecting a braze joint within a structure is disclosed. The method comprising the steps of disposing a tracer material in a braze filler material used to form the braze joint and detecting the presence of the tracer material at the braze joint to determine an integrity thereof.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical. As used herein, the term "substantially" means approximate to or almost.

Figure 1:
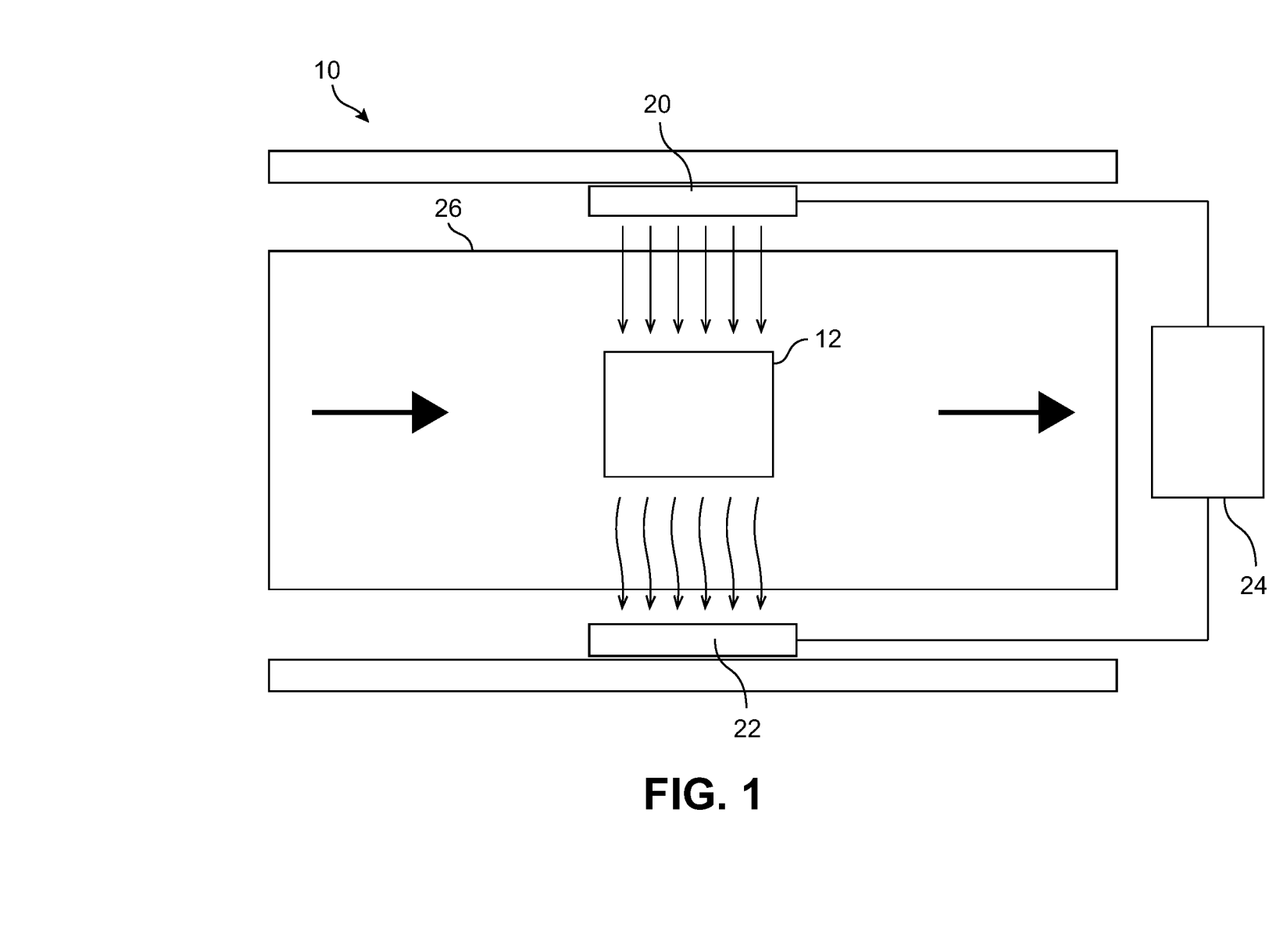
FIG. 1 is a schematic top plan view of an inspection system according to an embodiment of the present invention.
Figure 2:
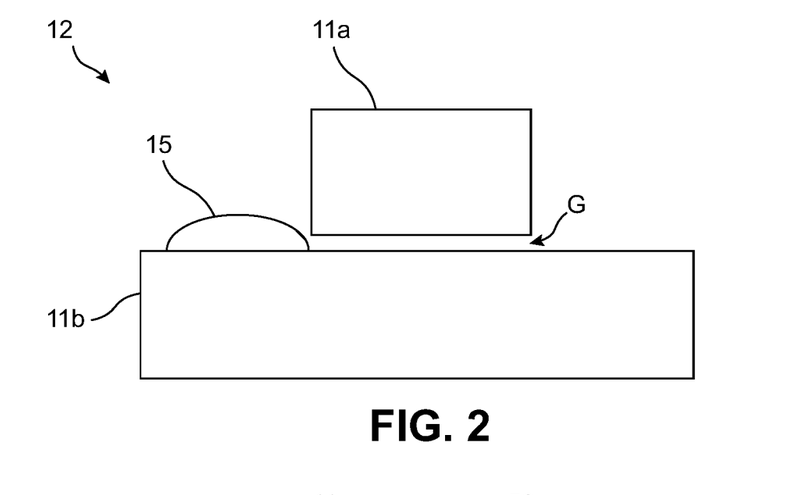
FIG. 2 is a side elevational view of two components used to form an exemplary structure using a brazing process.
Figure 3:
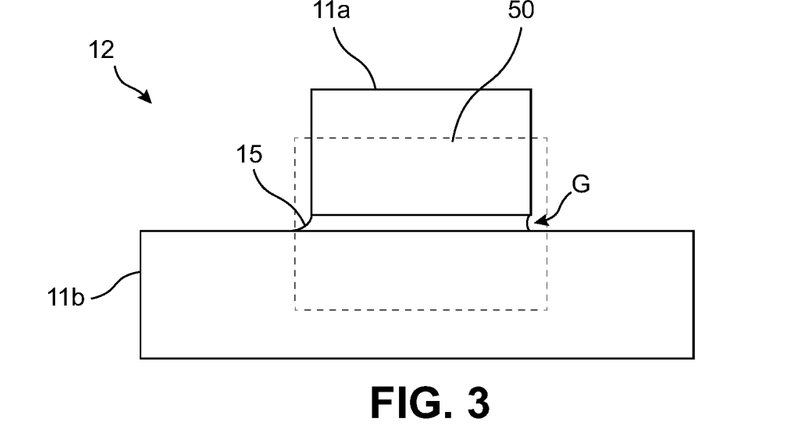
FIG. 3 is a side elevational view of the two components of FIG. 2 following a suitable brazing process wherein a deposition of braze filler material has fully filled a gap between the two components to properly form the structure.

FIG. 1 illustrates an inspection system 10 for inspecting the integrity of joints formed during a brazing process. As shown in FIGS. 2 and 3, the brazing process includes the coupling of at least two or more components 11a, 11b cooperating to form a structure 12. In the provided embodiments, the structure 12 may be representative of a portion of a heat exchanger having a plurality of joints formed between a plurality of independently provided components. The components in need of coupling may include the individual plates stacked to form a plate-type heat exchanger or the fins or similar structures used in forming flow divisions within the tubes of a tube-type heat exchanger, as non-limiting examples. It should be understood by one skilled in the art that the method disclosed herein may be applied to any type of structure utilizing a brazed joint regardless of the desired application or the configuration of the corresponding structure.

FIGS. 2 and 3 illustrate the formation of one exemplary joint between a first component 11a and a second component 11b that may be inspected by the system 10 according to the present invention. The first component 11a is formed from a first core material while the second component 11b is formed from a second core material. The first core material and the second core material may be the same material or may be different materials. The first core material and the second core material are each braze compatible materials such as metallic materials or composite materials. In the case of a heat exchanger, the core materials may be provided as aluminum or alloys thereof, such as aluminum-silicon alloys. However, one skilled in the art will appreciate that the method according to the present invention may be adapted for use with components formed from essentially any brazing compatible core materials, as desired, without departing from the scope of the present invention.

In the provided example, the first component 11a includes a deposition 15 of a braze filler material thereon. The deposition 15 of the braze filler material is shown in FIG. 2 as a localized deposition adjacent an end of a gap G formed between the first component 11a and the second component 11b. In other embodiments, each of the first component 11a and the second component 11b may include one or more of the depositions of the braze filler material, as necessary, to form the desired joint configuration between the components 11a, 11b. In some embodiments, the first component 11a and/or the second component 11b may include the deposition of the braze filler material on an entirety of one or more faces of the corresponding component 11a, 11b, such as in the form of a clad layer of the braze filler material. One skilled in the art will appreciate that any variety of different configurations for the deposition of the braze filler material may be utilized without departing from the scope of the present invention.

The braze filler material is formed from a base filler material and a tracer material. The base filler material is selected to include a melting temperature lower than a melting temperature of each of the first core material and the second core material. The base filler material may be formed from any conventional braze filler material compatible for forming a suitable joint between the first and second core materials. For example, in the case of a heat exchanger formed from an aluminum-silicon alloy, the associated braze filler material may be any one of an aluminum-silicon alloy, an aluminum-copper alloy, or an aluminum-zinc alloy selected to include a lower melting temperature than each of the first and second core materials. However, one skilled in the art will again appreciate that additional suitable combinations of complimentary and compatible core materials and base filler materials may be utilized for practicing the method according to the present invention without departing from the scope of the present invention.

The tracer material is substantially equally distributed throughout the base filler material. However, the tracer material is not alloyed with the base filler material, but instead forms a composite material with the base filler material. The non-alloyed relationship between the base filler material and the tracer material allows for the tracer material to be selected to include a greater melting temperature than the base filler material. Accordingly, upon a melting of the base filler material at the temperature lower than the melting temperature of the core materials, the tracer material is caused to flow in conjunction with the melted base filler material without similarly melting into the molten base material, thereby preventing alloying of the base filler material and the tracer material upon the heating of the components 11a, 11b during a brazing process. The tracer material accordingly remains within the molten base filler material as a plurality of spaced apart and evenly distributed solid particles of the tracer material during the heating of the components 11a, 11b. The solid particles of the tracer material may be selected to have any desired size, shape, configuration, and spacing for attaining a desired density of the tracer material within the base filler material, wherein the density of the tracer material within the base filler material is selected to be adequately detected by the inspection system 10.

The tracer material may be selected to include an energy signature that is substantially different from the energy signature of the base filler material, the first core material, and the second core material when detected by the inspection system 10 in order to easily distinguish the presence of the tracer material from the remaining materials. The distinguishing of the tracer material from the remaining materials forming the structure 12 during the inspection thereof is more thoroughly described with reference to the method of operation of the inspection system 10 hereinafter. The tracer material may also be selected to be substantially inert (non-radioactive). Suitable tracer materials may include boron carbide, boron nitride, zinc borate, borax, and combinations thereof. However, one skilled in the art will appreciate that any tracer material having a distinguishable energy signature when inspected according to the present invention may be utilized without departing from the scope of the present invention.

FIG. 2 shows the arrangement of the components 11a, 11b and the deposition 15 immediately prior to the initiation of a heating process involving the structure 12. In the present example, the heating process may be a batch process wherein a plurality of the structures 12 are heated simultaneously in a furnace, as desired. As shown by comparison between FIG. 2 and FIG. 3, the heating of the deposition 15 of the braze filler material causes the braze filler material to melt and flow in a direction towards the opposite side of the gap G while flowing between the first and second components 11a, 11b.

Referring back to FIG. 1, the inspection system 10 generally includes an energy source 20, an energy detector 22, and a data analysis system 24. The inspection system 10 may further include a conveyer 26 for supporting and transporting the structure 12 to be tested by the inspection system 10. The conveyer 26 may be configured to translate the structure 12 at a constant velocity relative to the energy detector 22 and the energy source 20 to allow for different portions the structure 12 to be sequentially inspected by the inspection system 10.

The energy source 20 is configured to generate and distribute energy towards the structure 12 during inspection thereof. The energy source 20 may be configured to deliver particles or electromagnetic waves towards the structure 12 for interacting with the structure 12. If electromagnetic waves are utilized, the electromagnetic waves may be selected to have a desired wavelength and amplitude for having a desired interaction with the structure 12. Similarly, if particles are used, the particles may be delivered at a desired energy by varying a velocity of the particles directed towards the structure 12, as desired.

The energy source 20 is configured to deliver the particles or waves towards a desired portion of the structure 12 in need of inspection. As such, the energy source 20 is configured for delivering the particles or waves from desired positions at desired angular orientations for interacting with a desired portion of the structure 12. The energy source 20 may accordingly be provided in a desired configuration for delivering the particles or waves towards the structure 12 while the particles or waves travel with a desired cross-sectional beam shape. The beam may be directed through one or more suitable collimators, as desired. The conveyer 26 may be utilized to move the structure 12 relative to the energy source 20 to allow for different portions of the structure 12 to be sequentially encountered by the particles or waves emitted from the energy source 20. However, one skilled in the art should appreciate that the energy source 20 may be arranged at any configuration suitable for causing the waves or particles emitted by the energy source 20 to interact with the structure 12 in a desired manner.

The energy detector 22 is configured to detect the energy relating to the interaction between the energy emitted from the energy source 20 and the structure 12. The energy detector 22 may be configured to detect the energy emitted from the energy source 20 after having interacted or not interacted with the structure 12 or may be configured to detect energy that results from the interaction between the energy and the structure 12, such as any particles or electromagnetic waves that may result from the interaction between the emitted energy and the structure 12.

The energy detector 22 may include any desired configuration suitable for receiving the energy from the energy source 20 or any particles/waves emitted from the structure 12 following the interaction between the energy and the structure 12. For example, the energy detector 22 may be provided to include substantially the same dimensions as the energy source 20 for receiving the beam at a cross-sectional shape that is the same as the cross-sectional shape of the beam with exiting the energy source 20. In the provided example, the energy detector 22 is disposed on an opposite side of the structure 12 from the energy source 20 to allow for the energy to interact with the structure 12 before the energy or the resultant effects therefrom continue in the same direction before being detected by the opposing energy detector 22. In other examples, the energy detector 22 may be arranged on the same side of the structure 12 as the energy source 20 to allow for the emitted energy or the energy resulting from the interaction to reflect back towards the energy detector 22.

The energy detector 22 may include any necessary structure for converting the energy or particles reaching the energy detector 22 into a form that can be easily understood and analyzed by the data analysis system 24. The energy detector 22 may accordingly convert any detected particle or wave into an associated electrical signal representative of the detected particle or wave. The energy detector 22 and the data analysis system 24 may accordingly work in unison to perform one or both of a radiography function or a spectrometry function regarding the energy detected by the energy detector 22. For example, the energy detector 22 may include the necessary structure and circuitry for converting the detected energy into a two-dimensional image or projection regarding the desired portion of the structure 12 via a radiography technique, or the energy detector 22 may include the necessary circuitry to form a spectrometer for separating and organizing information relating to different energy levels regarding the detected energy, as desired.

The inspection system 10 is shown as including a single energy source 20 and a single energy detector 22, but alternative configurations may be utilized for collecting additional data regarding the structure 12. For example, the inspection system 10 may include one or more additional energy sources and one or more additional energy detectors for viewing the structure 12 from one or more additional perspectives. For example, the inspection system 10 may include a second energy source 20 and a second energy detector 22 arranged to deliver and collect the particles/waves at an orientation perpendicular to that of the illustrated set, thereby allowing for the structure 12 to be analyzed three-dimensionally when the different perspectives are analyzed in conjunction by the data analysis system 24. One skilled in the art should appreciate that alternative arrangements may be used for further analyzing the structure 12 three-dimensionally, such as rotating the structure 12 relative to one or more of the paired sources and detectors. The use of multiple different energy sources may also include the use of two or more energy sources delivering particles/waves towards the structure 12 at different energy levels, wavelengths, or the like in order to analyze the structure 12 using two or more analysis methods.

The data analysis system 24 may form a portion of a controller configured to operate the inspection system 10 and generally includes a processor, memory, and any necessary instruction sets for carrying out the method of the present invention. Specifically, the data analysis system 24 is configured to receive data regarding the energy detected by the energy detector 22 and to analyze the collected data in order to inspect the integrity of a joint formed at a specific location within the structure 12. The data analysis system 24 is described in greater detail when describing the operation of the inspection system 10.

The inspection system 10 may be configured to analyze an entirety of the structure 12 or only select regions of the structure 12 corresponding to any joints formed therein. The data analysis system 24 may also be configured to analyze the entirety of the data regarding the structure 12 or may be configured to divide the data for performing a plurality of independent analyses. For example, the data analysis system 24 may be configured to divide the data into a plurality of discrete subsets with each of the subsets corresponding to a specified two-dimensional projection of the structure 12 in need of inspection, wherein each of the two-dimensional projections corresponds to the location of a joint formed between two or more of the components forming the structure 12.

According to one embodiment of the invention, the energy source 20, the energy detector 22, and the data analysis system 24 may form a portion of a nuclear inspection system 10 configured to utilize neutrons and/or gamma rays of different energies for inspecting the structure 12 via one or more analytical methods. The energy source 20 may accordingly be a neutron generator or an isotropic neutron source, as desired. The energy detector 22 may be a suitable radiographic scanner such as a gamma-ray scanner or a fast neutron scanner, as non-limiting examples. The corresponding scanner may include the aforementioned circuitry necessary for forming a spectrometer suitable for analyzing the elemental composition of the structure 12 following an interaction between the particles or waves generated by the energy source 20 and the structure 12. The data analysis system 24 may accordingly be configured to perform spectral analysis regarding the energy detected by the energy detector 22 and/or may be capable of generating a radiographic image of the structure 12, as desired.

Figure 5:
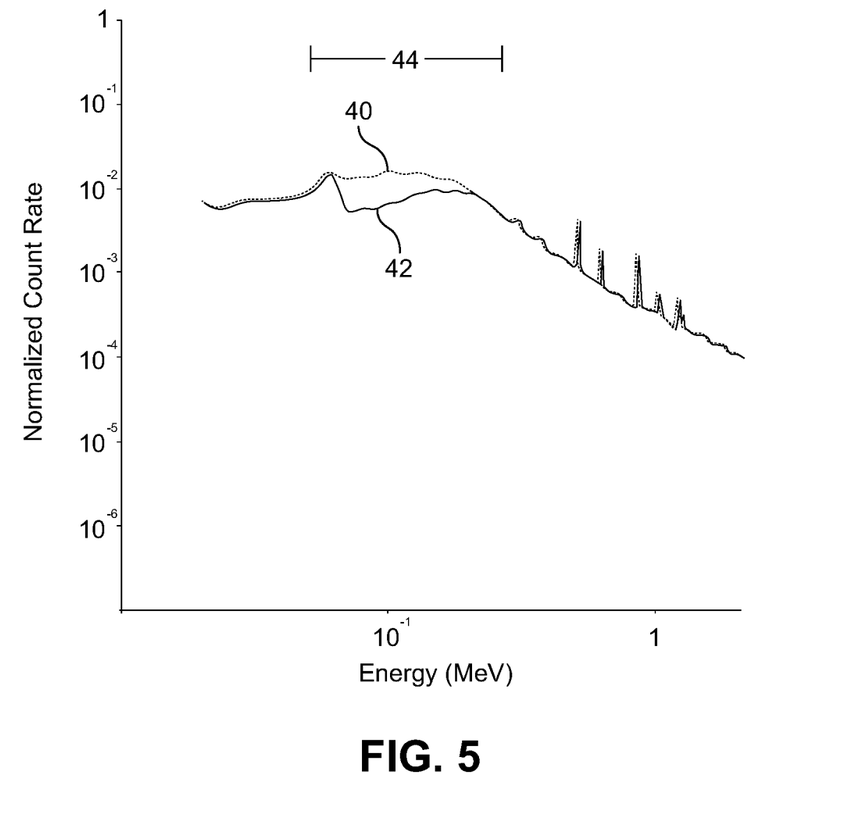
FIG. 5 is a graph illustrating differences between an ideal or reference spectra and a tested spectra, wherein each spectra corresponds to a desired portion of a structure in need of inspection by the system illustrated in FIG. 1.

FIG. 5 illustrates an exemplary spectra of the analyzed portion of the structure 12 when analyzed by the inspection system 10. The spectra charts the number of detections of a specific energy level over a given period of time as detected by the energy detector 22, wherein the number of detections is normalized to show the occurrence of each energy level detection relative to the total number of detections. FIG. 5 includes an illustration of a reference spectra 40 and a tested spectra 42. The reference spectra 40 represents the ideal spectra that would be expected if the analyzed portion of the structure 12, such as a specified joint formed therein, is properly detected and analyzed by the inspection system 10. The reference spectra 40 may be determined by repeated experimentation regarding an ideal joint formed within a representative example of the structure 12. Data regarding the reference spectra 40 is stored to the memory of the data analysis system 24. In contrast, the tested spectra 42 represents the spectra resulting from the analysis of the actual data collected by the data analysis system 24 via the energy detector 22.

FIG. 5 includes an illustration of a tracer energy range 44 corresponding to the expected energy range of the material (element) forming the tracer material included in the braze filler material when inspected by the inspection system 10. FIG. 5 further illustrates the expected energy levels of various different elements forming the structure 12 in addition to the tracer material, wherein the peaks formed in the reference spectra 40 to the right of the tracer energy range 44 may each correspond to the detection of a distinct element forming at least a portion of the structure 12.

The tracer material may advantageously be selected to include a tracer energy range 44 as detected by the inspection system 10 that is different from and substantially separated from the expected energy ranges detected when analyzing the portions of the structure 12 not including the tracer material, such as the aforementioned core materials forming the components 11a, 11b in the exemplary structure 12. For example, the tracer energy range 44 may cover energy levels lower than that of any other detected material as is the case in FIG. 5. The tracer energy range 44 is also shown in FIG. 5 as covering a substantially larger energy range than the other materials indicated by the adjacent peaks in the reference spectra 40, which are instead relatively narrow and sharp in shape in comparison to the peak corresponding to the tracer material. Additionally, the tracer material may be selected to be especially susceptible to detection by the inspection system 10 in comparison to the remaining materials utilized. In other words, the tracer material may be selected to include a relatively high capture rate by the energy detector 22 for a given cross-section in comparison to the remaining materials forming the structure 12. As shown in FIG. 5, this may result in the tracer material having the largest percentage of detections during the time frame the portion of the structure 12 is being inspected in comparison to the remaining materials forming the structure 12. The manner in which the tracer energy range 44 utilizes relatively low energy levels, is relatively broad in range, and is easily detected by the energy detector 22 results in the tracer material being ideal for detection using the inspection system 10.

It has been discovered that one particularly useful tracer material is boron-10 when interacted with by a stream of neutrons originating from a corresponding neutron source. The interaction of each of the neutrons with the boron-10 tracer material generates a spectra having a 478 keV energy peak and a broad line shape width that is approximately 8-10 times larger than the remaining materials typically utilized in braze joint formation.

The inspection system 10 generally operates as follows. The structure 12 is disposed at a desired position relative to the energy source 20 and the energy detector 22 for determining information regarding the structure 12. In the illustrated example, the structure 12 is disposed on the conveyer 26 and caused to travel at a constant velocity while passing by the energy source 20 and the energy detector 22. The different portions of the structure 12 pass by the energy source 20 and the energy detector 22 in sequential order to allow for the desired portion of the structure 12 to be inspected and analyzed with respect to at least one two-dimensional projection of the structure 12. The energy detector 22 continuously collects information regarding the desired portion of the structure 12 and communicates the information to the data analysis system 24. The data analysis system 24 in turn analyzes the data regarding the portion of the structure 12 being inspected in order to determine if a suitable or acceptable braze joint has been formed at the location being inspected.

As discussed previously, the data analysis system 24 may be configured to perform a plurality of independent analyses regarding the structure 12, such as one analysis for every braze joint formed within the structure 12. Each independent analysis may be performed with respect to the data corresponding to a different two-dimensional projection of the structure 12 from the perspective of the energy detector 22. For example, with renewed reference to FIGS. 3 and 4, a bounding box 50 illustrates a preselected two-dimensional projection of the structure 12 independently analyzed by the data analysis system 24. A larger structure including a plurality of repeated braze joints, such as one of the heat exchangers discussed herein, may include the independent analysis of a plurality of such two-dimensional projections of the structure 12, with each analysis corresponding to one of the braze joints.

The data analysis system 24 performs a data analysis of each desired portion of the structure 12. The values of the energy levels and the number of relative detections of the different energy levels as determined when creating the corresponding tested spectra are compared to the expected values of the energy levels and number of detections corresponding to the reference spectra experimentally determined for each portion of the structure 12 in need of inspection. The data analysis system 24 may be programmed to determine that a significant deviation has occurred when a threshold number and/or degree of differences have been detected between the instantaneous test spectra and the stored reference spectra. The threshold being met may cause the data analysis system 24 to inform an operator thereof that an insufficient braze joint has been formed within the inspected portion of the structure 12.

The configuration of the structure 12 in FIG. 3 is representative of an ideal braze joint formed between the components 11a, 11b wherein the gap G is completely filled with the corresponding braze filler material to maximize the strength of the joint formed between the first component 11a and the second component 11b. The tracer material contained within the deposition 15 of the braze filler material flows with the remaining base filler material such that an entirety of the two-dimensional projection of the braze filler material should be detectable by the inspection system 10. The two-dimensional footprint of the tracer material relative to the remainder of the bounding box 50 should accordingly correspond to the number of detections of the tracer material when the bounding box 50 is analyzed independently from the entirety of the structure 12. As such, each inspection of the portion of the structure 12 within the bounding box 50 should result in the same relative number of detections of the tracer material relative to the remaining materials. An inspection of the portion of the structure 12 within the bounding box 50 of FIG. 3 should accordingly result in the inspection system 10 generating a tested spectra for the bounding box 50 that is substantially identical to the reference spectra stored to the memory of the data analysis system 24.

For example, assuming FIG. 5 is representative of the spectra of the portion of the structure 12 within the bounding box 50, the tested spectra for the inspection of the bounding box 50 would be expected to substantially correspond to the shape of the reference spectra 40 illustrated in FIG. 5. The deviations between the tested spectra and the reference spectra would accordingly be relatively low, and the inspection system 10 would determine that the inspected braze joint is suitable.

Figure 4:
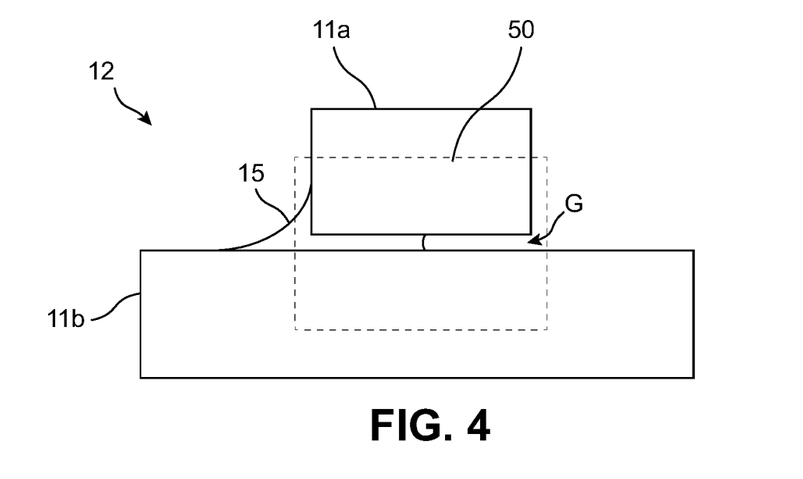
FIG. 4 is a side elevational view of the two components of FIG. 2 following an undesirable brazing process wherein the deposition of braze filler material has not fully filled the gap between the two components.

In contrast, FIG. 4 shows an unsuitable braze joint wherein the braze filler material has not flowed across an entirety of the gap G, thereby presenting an increased risk of separation between the first component 11a and the second component 11b during use of the resulting structure 12. The lack of flow of the braze filler material results in only a portion of the gap G being filled and a smaller portion of the two-dimensional footprint of the braze filler material being within the bounding box 50 in comparison to the ideal braze joint illustrated in FIG. 3. The smaller projection of the braze filler material within the bounding box 50 should accordingly lead to fewer detections of the tracer material than would be expected when inspecting a suitable braze joint within the same two-dimensional projection. This difference results in significant deviations between the generated test spectra and the reference spectra saved to the memory of the inspection system 24.

For example, again assuming FIG. 5 is representative of the spectra corresponding to the inspection of the bounding box 50, the inspection of the bounding box 50 in FIG. 4 may lead to the resulting test spectra showing fewer detections of the energy levels corresponding to the tracer energy range 44 than would be expected. The tested spectra 42 shown in FIG. 5 may accordingly be representative of the inspection of the bounding box 50 in FIG. 4, wherein the tested spectra 42 deviates from the reference spectra 40 within the tracer energy range 44 by dipping below the curve of the reference spectra 40. The inspection system 10 accordingly determines that the braze joint shown in FIG. 4 is unsuitable and indicates such to the operator of the system 10.

One skilled in the art should appreciate that the same technique may also be utilized to determine where excessive amounts of the braze filler material are present, such as those locations wherein the braze filler material has not flowed as expected or has flowed to improper positions within the structure 12. For example, a shifting of the bounding box 50 to the left in FIG. 4 would result in greater detections of the tracer material within the newly formed bounding box than would be expected if the braze filler material had properly flowed towards the other end of the gap G during the brazing process. Such techniques may also be helpful for determining other characteristics of the braze joint, such as the amount of braze erosion into the adjacent core materials forming the components being joined. The method according to the present invention may accordingly be adapted to determine when the thickness of the corresponding core materials has been reduced as a result of the discovered braze erosion.

The inspection system 10 may be particularly effective if two different energy source 20 and energy detector 22 pairs are used to inspect the structure 12 from two different and perpendicular arranged perspectives. Many brazed structures, such as heat exchangers, include repeating three-dimensional features that may overlap with each other when the structure 12 is inspected from only a specific perspective, thereby frustrating the ability to determine which braze joint is causing any differences between the reference spectra and the test spectra during the inspection process. The use of two different inspection perspectives solves this problem by allowing for a three-dimensional analysis of the structure 12. The structure 12 may be initially inspected from a first perspective wherein a specified two-dimensional projection of the structure 12 is inspected to determine that a deviation has occurred within the projection. The structure 12 may subsequently be inspected from the second perpendicular perspective to determine the position of the unsuitable joint causing the deviation in a third direction, thereby establishing the three-dimensional position of the source of the deviations. The combination of the data from each paired source and detector results in the ability to form a three-dimensional map of the structure 12 with the tracer material contained within the braze filler material being distinguishable from the remainder of the structure 12.

The disclosed inspection system 10 advantageously allows for the detection of an unsuitable braze joint using an automated process. The manner in which the tested spectra is compared to the reference spectra is especially advantageous as such a comparison is relatively simple from a computational perspective. Specifically, the detected energy levels and the number of detections of the corresponding energy levels can be easily compared to each other without having to account for more complicated computational factors such the specific shape of the braze filler material relative to the adjacent components. For example, the data analysis system 24 may merely sum all of the detected differences between the tested count rate and the expected count rate with respect to each energy level falling within the tracer energy range when determining if the threshold has been met for determining that an unsuitable joint has been formed. Alternatively, a root mean square analysis may be performed with respect to each of the discovered differences within the tracer energy range when determining if the threshold has been reached.

As mentioned previously, the inspection system 10 may also optionally include a radiography feature for displaying images of the structure 12 as detected by the energy detector 22. Such images can be adapted to show both the shape and the material composition of for each two-dimensional projection that can be shown in similar fashion to the images of an inspection system used in airport security applications. For example, the tracer material may appear as a different color or shade in the produced images than the remaining materials forming the structure. As such, the addition of the tracer material to the braze filler material advantageously allows for such images to easily show the distinction between the core materials and the tracer material, thereby showing the specific shape of the braze filler material within the structure.

Such radiographic images may be analyzed by an operator of the inspection system 10, as needed, when additional information is required regarding one of the braze joints. Furthermore, the inspection system 10 may be adapted to utilize such images for carrying out more complicated computational processes than those described herein, such as utilizing certain algorithms for analyzing the shape and size of the detected two-dimensional projections of the tracer material corresponding to the location of the braze filler material. The inspection system 10 may be further adapted for creating a full three-dimensional representation of the structure 12 with the locations of the braze filler material easily identified within the three-dimensional model. The shape and the size of the three-dimensional representation of each of the braze joints may similarly be analyzed by the data analysis system 24 for comparison to an expected or reference shape and size, as desired.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. An inspection system comprising:
    an energy detector configured to detect a presence of a tracer material in a structure;
    a data analysis system in signal communication with the energy detector, the data analysis system configured to receive data regarding detection of the presence of the tracer material in the structure; and
    an energy source configured to direct energy towards the structure being tested, wherein the data analysis system is configured to perform spectral analysis regarding the data received from the energy detector, wherein the data analysis system determines a tested spectra regarding the structure being tested using the data received from the energy detector and compares the tested spectra to a reference spectra stored to a memory of the data analysis system, wherein the reference spectra corresponds to a spectra of the structure when the tracer material is positioned in a desired configuration relative to the structure, and wherein the data analysis system generates a control signal indicative of an unsuitable braze joint when a threshold value of difference is reached when comparing the tested spectra to the reference spectra.

2. The inspection system of claim 1, wherein the energy source is a neutron generator.

3. The inspection system of claim 1, wherein the tracer material is disposed within a braze filler material used to couple two or more components forming the structure.

4. The inspection system of claim 3, wherein the tracer material is substantially evenly distributed throughout the braze filler material.

5. The inspection system of claim 3, wherein the tracer material is not alloyed with the braze filler material.

6. The inspection system of claim 3, wherein the tracer material is boron-10.

7. A method of inspecting a braze joint within a structure, the method comprising the steps of:
    disposing a tracer material in a braze filler material used to form the braze joint; and
    detecting a presence of the tracer material in a desired configuration in the braze joint to determine an integrity of the braze joint; and
    analyzing data accumulated during the detecting of the presence of the tracer material at the braze joint, wherein the analyzing of the data includes performing spectral analysis regarding the data, wherein the spectral analysis includes determining a tested spectra regarding the braze joint and comparing the tested spectra to a reference spectra, wherein the reference spectra corresponds to a spectra of the braze joint when the tracer material is positioned in a desired configuration, and wherein a difference determined between the tested spectra and the reference spectra indicates that the tracer material is not positioned at the desired configuration.

8. The method of claim 7, further comprising a step of directing energy towards the braze joint to interact with the tracer material.

9. The method of claim 8, wherein the energy is a stream of neutrons directed by a neutron generator.

* * * * *